United States Patent [19]

Sheinman

[11] Patent Number: 5,626,799
[45] Date of Patent: May 6, 1997

[54] HEAT-MASS EXCHANGE SYSTEM

[75] Inventor: Vladimir I. Sheinman, Moscow, Russian Federation

[73] Assignee: Tovarischestvo S Ogranichennoi Otvetstvennostju Nauchno-Proizvod-Stvennaya Kompaniya "Kedr-89", Moscow, Russian Federation

[21] Appl. No.: 586,710
[22] PCT Filed: Jul. 28, 1993
[86] PCT No.: PCT/RU93/00181
  § 371 Date: Jan. 29, 1996
  § 102(e) Date: Jan. 29, 1996
[87] PCT Pub. No.: WO95/03865
  PCT Pub. Date: Feb. 9, 1995

[51] Int. Cl.⁶ .................................................. B01F 3/04
[52] U.S. Cl. ................................................... 261/79.2
[58] Field of Search .................................... 261/79.2

[56] References Cited

U.S. PATENT DOCUMENTS

| | | | |
|---|---|---|---|
| 2,354,674 | 8/1944 | Fisher | 261/79.2 |
| 2,596,105 | 5/1952 | Schneible | 261/79.2 |
| 3,345,046 | 10/1967 | Versluys et al. | 261/79.2 |
| 4,062,663 | 12/1977 | Spevack | 261/79.2 |
| 4,755,198 | 7/1988 | Darton | 261/79.2 |
| 5,145,612 | 9/1992 | Reay et al. | 261/79.2 |

FOREIGN PATENT DOCUMENTS

| | | | |
|---|---|---|---|
| 0580868 | 11/1977 | U.S.S.R. | 261/79.2 |
| 0604563 | 4/1978 | U.S.S.R. | 261/79.2 |

*Primary Examiner*—Tim R. Miles
*Attorney, Agent, or Firm*—Jacobson, Price, Holman & Stern, PLLC

[57] ABSTRACT

The proposed heat-mass exchange system comprises a housing (1) with plates on whose blade are arranged turbulence contact elements comprising: a coaxially mounted cylindrical shell (4) with apertures (5) in the lower section and vertical slits (6) in the upper section; baffle (10); an overflow pipe (7); and a swirl vane (12). The novelty of the proposed heat-mass exchange system is the design of the blade in the form of a set of upwardly flanged shelves (2) along whose longitudinal axis are mounted a series of turbulence contact elements, while grooves (8) are fashioned around the circumference of the lateral edges underneath the intake sections of the overflow pipes (7) mounted therein; the blade of the plates is provided with longitudinal plates (3) secured between the flanges of the shelves (2) and in the grooves (9) formed in the intake sections of the overflow pipes (7) which protrude above the blade, while the longitudinal axes of abutting shelves (2) intersect at right angles. In addition, the swirl vanes of the contact elements are made together with the blade by stamping from the shelf (2) material and have an angle of attack of 10° to 45°. In addition, the contact element has the following geometric parameters: $H=(0.5–3.0)D$; $d=(0.2–0.5)D$, where H represents the height of the shell (4); D is the diameter of the shell (4); d is the diameter of the overflow pipe (7), the shell (4) being provided with an additional swirl vane (12).

3 Claims, 2 Drawing Sheets

HEAT-MASS EXCHANGE SYSTEM

This application is a 371 of PCT/RU/93/00181 Jul. 28, 1993.

The invention relates to the equipment to be used in the processes of mass exchange, in particular to the heat-mass exchange systems.

BACKGROUND OF THE INVENTION

Heat-mass exchange systems for gas (steam) and liquid contact comprising a housing with plates provided with turbulence contact elements are known (see SU, A1, 182108, 1966; SU, A1, 572272, 1977; SU, A1, 301429, 1987; SU, A1, 1398888, 1988; U.S. Pat. No. 4,237,426, 1980). Each turbulence contact element in this system is provided with a separating shell and a swirler giving an intensive phase contact due to rotating movement of the stream and its following separation.

However, these known systems operate effectively only in the narrow ratio band of the phase rates because of the great possibility at high rates of the liquid overflooding or downfall and at low rates the liquid is being carried away.

Known too are heat-mass exchange systems comprising a housing with plates on whose blade are arranged turbulence contact elements provided with coaxially mounted cylindrical shell with apertures in the low section and vertical slits in the upper section, a baffle, an overflow pipe and a swirl vane (see SU, A1, 580068, 1977). In this system swirled in the swirl vane gas (steam)being with contact with liquid incoming through the overflow pipe throws the liquid against the shell. The liquid after the contact is withdrawn in different operating regimes through the apertures, vertical slits or circular gap between the shell and the baffle.

However, in this system the apertures of the greate diameter available in the band of the plate for mounting in them the swirl vanes and overflow pipes limit the quantity of the swirl elements arranged thereon and thereby influencing on the output of the system. In addition the known systems have increased hydraulic resistance due to liquid stream incoming to the overflow pipe in turbulized condition.

SUMMARY OF THE INVENTION

The main object of the invention is improvement of the performance of the heat-mass exchange system owing to rigid construction of the blade of the plate, providing arrangement on it a great number of the swirl vanes and creating laminar movement of the liquid stream in the overflow pipe.

According to the invention in the heat-mass exchange system comprising the housing with the plates on whose blade are arranged the turbulence contact elements, the coaxially mounted cylindrical shell , the baffle, the overflow pipe with the apertures in the lower section and the vertical slits in the upper section, the blade are manufactured in form of a set of upwardly flanged shelves along whose longitudinal axis are mounted a series of the turbulent contact elements, while the grooves are fashioned around the circumference undernearth the intake section of the overflow pipes mounted therein; the blade of the plates is provided with the longitudinal plates secured between the flanges of the shelves and in the grooves formed in the intake section of the overflow pipes which protrude above the blade, while the longitudinal axis of the abutting shelves intersect at right angles. In addition the swirl vanes of the contact elements are made together with the blades by stamping of the shelves material and have an angle of attack of 10 to 45 degrees, and the shell and the overflow pipe are defined by the following ratio of geometric parameters:

$$H=(0.5-3.0)D; \quad d=(0.2-0.5)D$$

where H represents the hight of the shell

D is the diameter of the shell d is the diameter of the overflow pipe the shell is provided with the additional swirl vane.

BRIEF DESCRIPTION OF THE DRAWINGS

The invention is illustrated by way of reference to the accompanying drawings, wherein.

DESCRIPTION OF PREFERRED EMBODIMENTS

Figure 1:
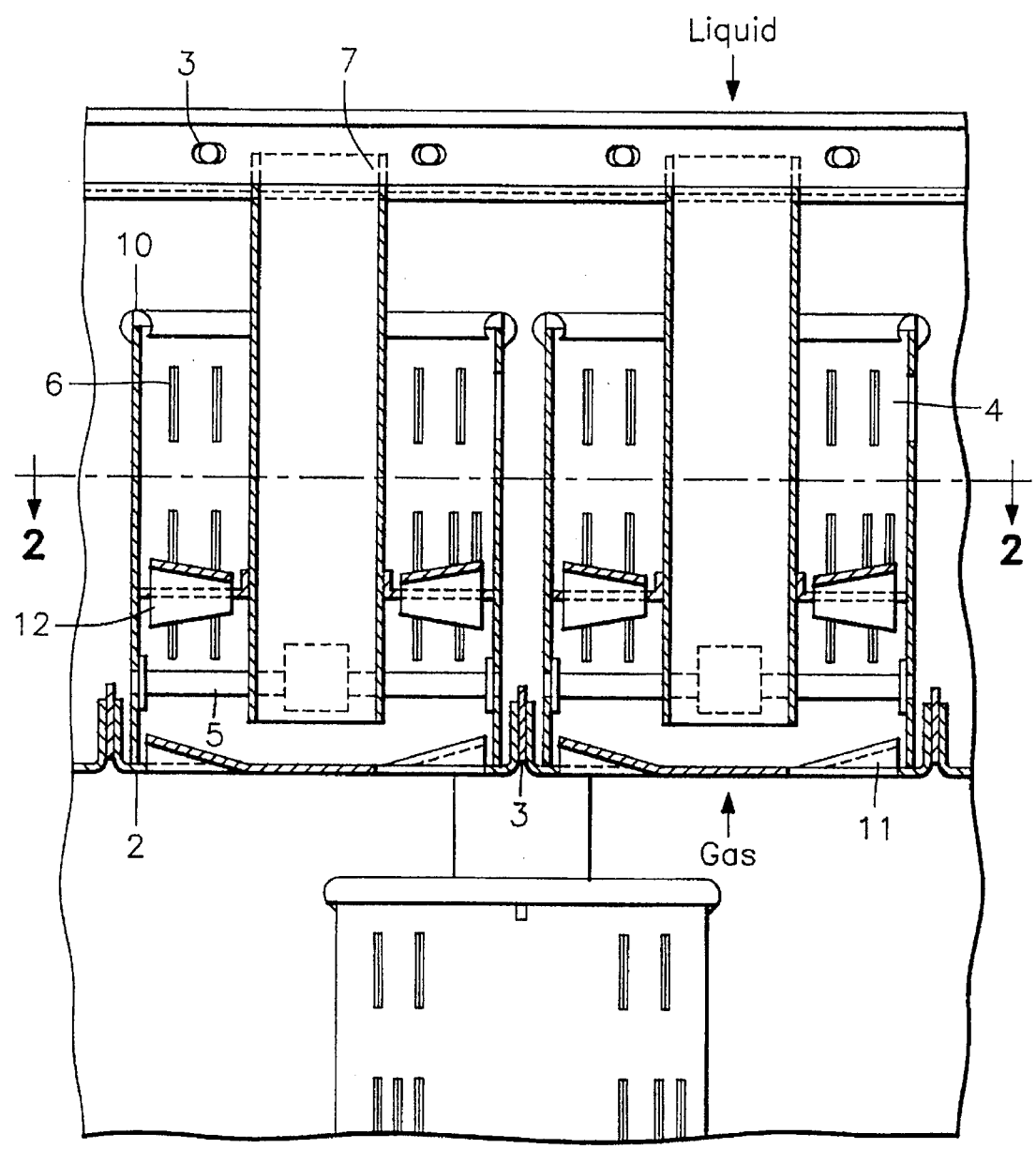
FIG. 1 is a longitudinal cross section of the heat-mass exchange system according to the present invention.
Figure 2:
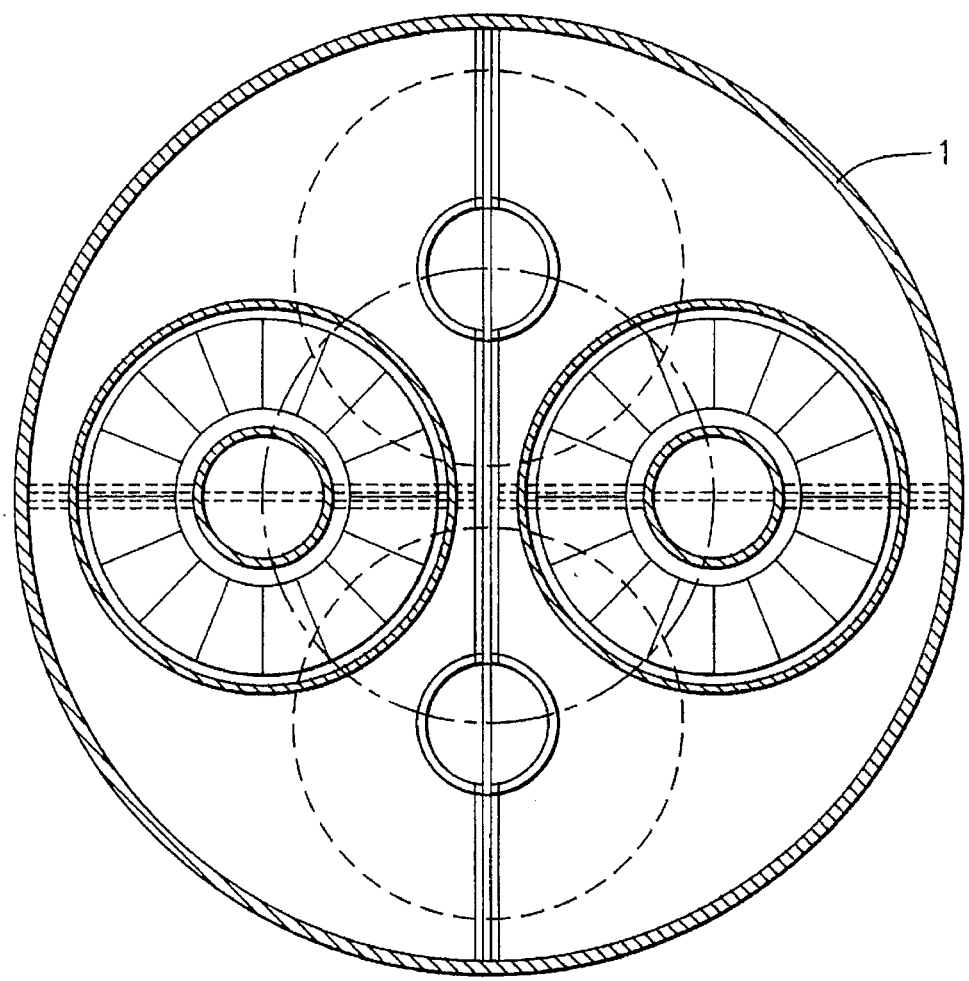
FIG. 2 is a cross sectional view taken on line A—A in FIG. 1.
Figure 3:
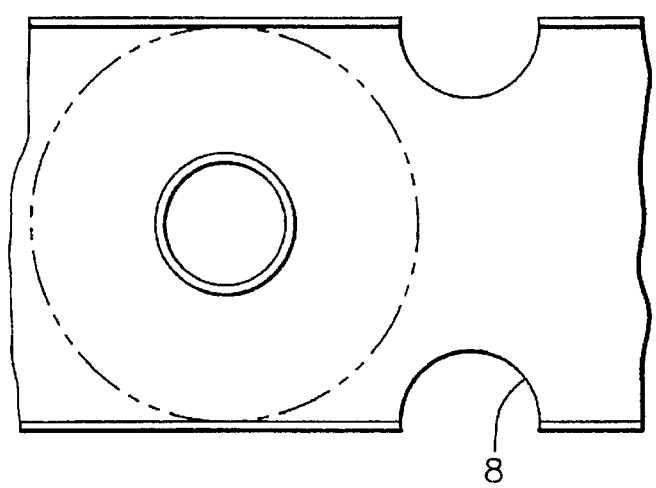
FIG. 3 is a view of the shelves embodiment.
Figure 4:
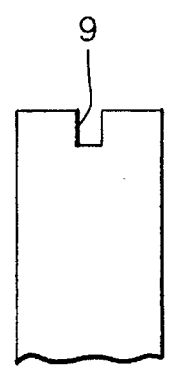
FIG. 4 is a sectional view of the upper section of the overflow pipe embodiment.

The heat mass-exchange system is provided with housing 1 in which plates having turbulent contact elements are arranged. The blade of the plates is made of the set connected with each other along the flanged upwardly edges of the shelves 2 between which are arranged the longitudinal securing plates 3 that increase the rigidity of the structure. The turbulent contact element includes the separating cylindrical shells 4 coaxially mounted on the blade, in the lower section of which are the apertures 5 and in the upper section the vertical slits 6, the overflow pipes 7, the intake sections of which are secured in the grooves 8 of the shelves 2. The intake sections of the overflow pipes protruding above the blade have the grooves 9, the plates 3 are passed through and rigidly secured to the overflow pipes 7. The shell 4 is provided with the baffle 10 mounted with a gap with regard to its upper face, the swirl device 11, made together with the blade by stamping of the shelves 2 and additional swirl vane 12 arranged inside of the shell 4. For all this the ratio of the height "H" of the shell 4 to its diameter "D" is of 0.5 to 3.0; the diameter "d" of the overflow pipe 7 is of 0.2 to 0.5 of the diameter "D" of the shell 4, and the angle of attack of the swirl devices 11, 12 is choosen of 10 to 45 degrees.

The system operates in the following manner. The liquid from the blade of the upper plate enters through the overflow pipe 7 in the contact element for contacting with the gas (steam) flow turbulized by the swirl device 11, which disperses the liquid, throwing it aganst the inner surface of the shell 4 and providing swirling movement. Under the action of the centrifugal force the phase separation occurs on the shell 4, while the gas passes through the gap between the baffle 10 and the overflow pipe 7 and enters from the intercontact space to the entrance of the swirl device 11 of the upper plate and the liquid being withdrawn in the intercontact space through the apertures 5 in the bubbling operating regime (under increased liquid charges) and preferably through the lower section of the vertical slits 6 and the apertures 5 in the combined operating regime; through the upper section of the vertical slits 6 and in the gap between the face of the shell 4 and the baffle 10 with additional turbulization by the swirl vane 12 in the operating regime of the phase inversion ( under the increased gas charges) and enters through the overflow pipe 7 to contact elements of the below arranged plate. Simultaneously the plates 3 arranged in the intake sections of the overflow pipes 7 "unswirl" the liquid flows, providing them the laminar type of stream.

According to the invention the blade of the plate embodiment brings about to increasing of its rigidity due to the shelves connection by the additional securing plates inserted in the grooves of the overflow pipes and between the flanged edges of the shelves, providing additional function of the rigid ribs; the sections of the securing plates arranged inside the overflow pipes provide unswirled type of the liquid stream, decreasing by this the hydraulic resistance and increasing the liquid charge. The arrangement at right angle of the longitudinal axis of the abutting along the height of the plates brings about to assemble the plates of the standard shelves.

The proposed invention gives the opportunity to create simple, rigid and reliable embodiment of the heat-mass system of high out put in the wide band of the charges due to the special embodiment of the blade of the plate as the set of the flanged strips and chosen band of ratio of the geometrical parameters of the swirl contact element.

The invention may be used in chemical and oil industries so as in the allied industries, where heat-mass exchange systems are in operation.

What we claim is:

1. A heat-mass exchange system comprising a housing with plates on whose blade are arranged turbulence contact elements including coaxially mounted cylindrical shell with apertures in a lower section and vertical slits in an upper section, a baffle, an overflow pipe and a swirl vane wherein the blade is manufactured in the form of a set of upwardly flanged shelves along which longitudinal axis are mounted in series the turbulent contact elements while grooves are fashioned around the circumference underneath to intake sections of the overflow pipes mounted therein; the blade of the plates is provided with longitudinal plates, secured between the flanges of the shelves and in grooves formed in the intake sections of the overflow pipes, which protrude above the blade, while the longitudinal axis of the abutting shelves intersect at right angles.

2. The heat mass-exchange system according to claim 1 wherein the swirl vanes of the contact elements made together with the blade by stamping of the shelves material and have an angle of attack of 10 to 45 degrees.

3. The heat mass-exchange system according to claim 1 wherein the contact elements are made with following ratio of geomrtric parameters:

$$H=(0.5-3.0)$$

$$d:(0.2-0.5),$$

where

H represents the height of the shell

D is the diameter of the overflow pipe and the shell being provided with an additional swirl vane.

* * * * *